(12) United States Patent
Schlick et al.

(10) Patent No.: US 10,082,220 B2
(45) Date of Patent: Sep. 25, 2018

(54) ELECTROMAGNETICALLY OPERATED SWITCH VALVE

(71) Applicant: Rausch & Pausch GmbH, Selb (DE)

(72) Inventors: Matthias Schlick, Oelsnitz/V. (DE); Sebastian Clauβ, Ilmenau (DE); Johannes Stock, Erbendorf (DE); Julius Hudec, As (CZ)

(73) Assignee: Rausch & Pausch GmbH, Selb (DE)

( * ) Notice: Subject to any disclaimer, the term of this patent is extended or adjusted under 35 U.S.C. 154(b) by 12 days.

(21) Appl. No.: 15/208,806

(22) Filed: Jul. 13, 2016

(65) Prior Publication Data

US 2017/0016552 A1    Jan. 19, 2017

(30) Foreign Application Priority Data

Jul. 16, 2015    (DE) .......................... 10 2015 111 561

(51) Int. Cl.
*F16K 31/06* (2006.01)
*H01F 7/08* (2006.01)
(Continued)

(52) U.S. Cl.
CPC ...... *F16K 31/0693* (2013.01); *F16K 31/0655* (2013.01); *F16K 31/0675* (2013.01);
(Continued)

(58) Field of Classification Search
CPC ............. F16K 31/0693; F16K 31/0686; F16K 31/0689; F16K 31/0658; F16K 31/0655;
(Continued)

(56) References Cited

U.S. PATENT DOCUMENTS

| 7,146,943 B2 * | 12/2006 | Sedda ...................... F01L 9/04 |
| | | 123/90.11 |
| 2005/0269538 A1 * | 12/2005 | Haynes ............... F16K 31/0606 |
| | | 251/129.15 |

(Continued)

FOREIGN PATENT DOCUMENTS

| DE | 4442190 A1 | 5/1996 |
| DE | 102007022712 A1 | 11/2008 |

(Continued)

OTHER PUBLICATIONS

European Office Action dated Dec. 22, 2016, in connection with corresponding EP Application No. 16179446.6 (7 pgs).

(Continued)

*Primary Examiner* — Ian Paquette
(74) *Attorney, Agent, or Firm* — Maier & Maier, PLLC

(57) ABSTRACT

The pole geometry of an electromagnetic switch valve includes a cylindrical well on the pole member, which is penetrated by a cylindrical pin on the magnetic armature. This obtains a magnetic force-stroke curve that first extends proportionally starting out from the initial position of the magnetic armature and then rises progressively until the magnetic armature reaches the end position. Continuously increasing the energizing of the magnetic drive upon shifting of the magnetic armature from its initial position into its end position enables the noise formation upon the closing process of the valve to be reduced. Accordingly, the noise formation upon the opening process of the valve can be reduced when the energizing of the magnetic coil is reduced not abruptly but continuously.

15 Claims, 4 Drawing Sheets

Figure 1:
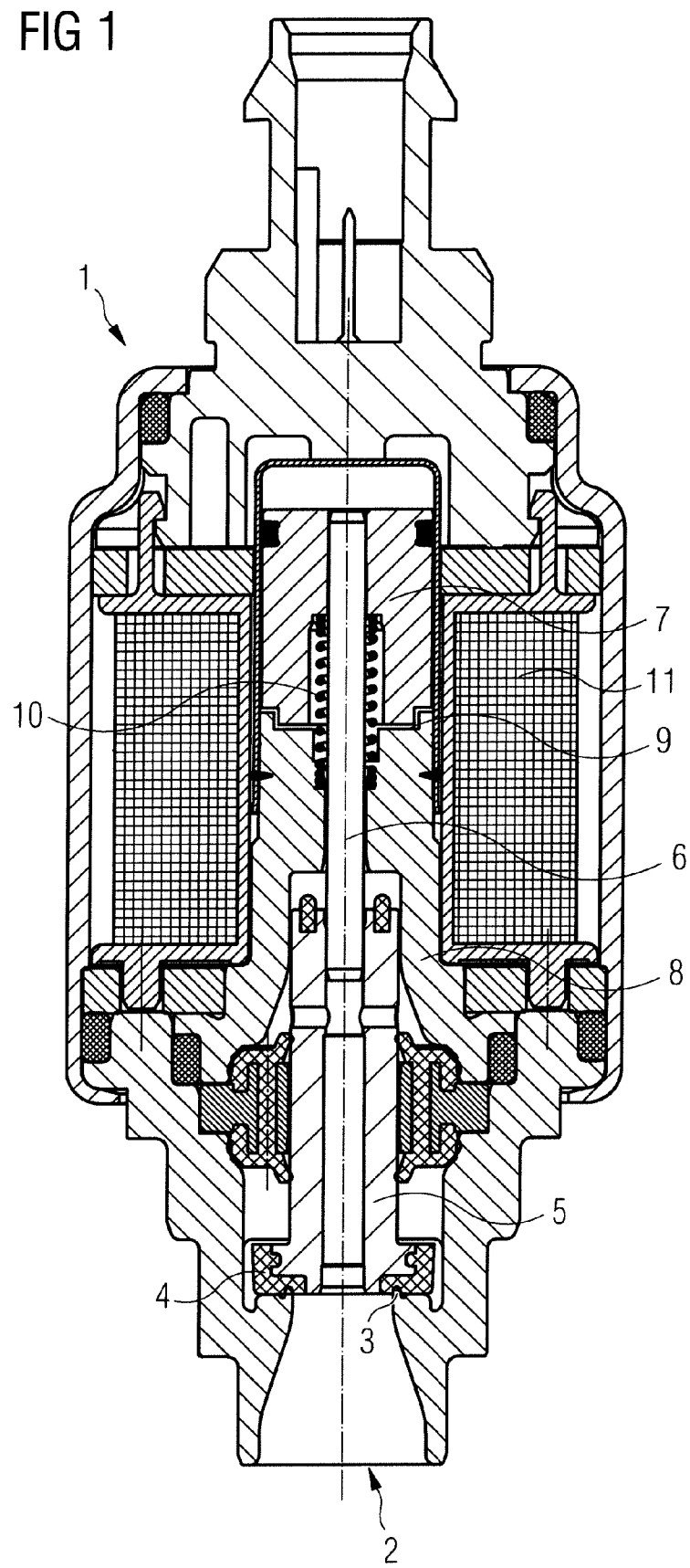

(51) Int. Cl.
*H01F 7/18* (2006.01)
*F16F 9/34* (2006.01)

(52) U.S. Cl.
CPC ............... *H01F 7/08* (2013.01); *H01F 7/18* (2013.01); *F16F 9/34* (2013.01)

(58) Field of Classification Search
CPC .......... F16K 31/0675; H01F 7/18; H01F 7/08; F16F 9/34
USPC ........................ 251/129.02, 129.07, 129.15
See application file for complete search history.

(56) References Cited

U.S. PATENT DOCUMENTS

2010/0025605 A1* 2/2010 Galtz ................ B60H 1/2203
251/129.15
2014/0217318 A1* 8/2014 Schlick ................ F16J 15/3232
251/129.15
2014/0238354 A1 8/2014 Imai
2014/0240886 A1 8/2014 Itaya et al.
2015/0182133 A1* 7/2015 Sano ........................ F16K 1/36
600/498

FOREIGN PATENT DOCUMENTS

| | | |
|---|---|---|
| DE | 102011078102 A1 | 12/2012 |
| DE | 102012204466 A1 | 9/2013 |
| DE | 102013209070 A1 | 11/2014 |
| EP | 2910828 A1 | 8/2015 |

OTHER PUBLICATIONS

First Office Action issued in corresponding German Application No. 10 2015 111 561.1 (10 pgs.).

* cited by examiner

ELECTROMAGNETICALLY OPERATED
SWITCH VALVE

The present invention concerns an electromagnetically operated switch valve, as finds application for example in automobile air suspension systems.

Such a valve consists substantially of an electrically energizable coil and an appurtenant iron circuit in which a magnetic field is induced upon electrical energizing of the coil. The iron circuit or magnetic circuit comprises, on the one hand, a movably mounted structural part, the magnetic armature, and, on the other hand, a stationary structural part or structural group, also designated as a casing, having a pole member slightly spaced from the magnetic armature. The distance between magnetic armature and pole member defines a working air gap. When a sufficiently great electric current flows through the coil, the magnetic armature performs a relative motion across the working air gap toward the pole member as a result of the induced magnetic field. Said relative motion is utilized to block or release flow openings in the valve, that is, to switch between two states, "open" and "closed", directly or via structural parts coupled to the magnetic armature. Blocking is typically done using an elastic sealing element, in particular an elastomer sealing element, which presses on an opposing sealing seat for blocking the flow opening and is lifted thereoff again for releasing the flow opening. To avoid magnetic adherence of the magnetic armature to the pole member when the elastomer sealing element is bearing against the sealing seat, there remains between the magnetic armature and the pole member a residual air gap, the so-called "remanence gap".

In known valves, a first, neutral switch position of the sealing element is ensured by a mechanical component force in the valve. This is done as a rule using a spring element. Said neutral switch position will hereinafter be designated the "initial position" of the magnetic armature. The sealing element is switched to the second switch position as a result of permanent energizing of the coil, with the magnetic force generated thereby acting against the mechanical component force or against the spring force and overcoming it. Said second switch position will hereinafter be designated the "end position" of the magnetic armature. The motion of the magnetic armature out of its initial position into its end position defines the "stroke", whereby the sealing element bearing against the sealing seat as a rule defines the stroke stop and thus simultaneously the end position for the magnetic armature. As soon as the electrical energizing of the coil is stopped, the spring force effectuates a backward motion of the magnetic armature into its initial position and thus a return of the sealing element into the first switch position.

Such valves are applied in air suspension systems of automobiles in different ways and for different functions. For example, there are valves for filling and emptying the air spring bellows, valves for connecting or disconnecting accumulators in the system, as well as valves via which the bellows volumes can be connected to additional volume as needed.

DE 10 2011 078 102 A1 proposes in connection with such an electromagnetically operated seat valve, reducing the noise generated by the valve in the closed position and occurring due to a PWM signal control by providing an additional stop for the magnetic armature, which the magnetic armature bears against directly or indirectly as long as the sealing element is located in the closed position.

Further noise, which can also be perceived inside the vehicle, arises for functional reasons when the magnetic armature reaches its end position, for example when the sealing plunger hits the sealing seat and/or the magnetic armature hits the additional stop. Corresponding noise also arises when the magnetic armature is moved back into its initial position. For reducing said switching noise, damping knobs are provided on the magnetic armature and/or on the sealing seat, or the valve is acoustically decoupled from adjacent structural groups.

The object of the present invention is to propose alternative or supplementary measures for noise reduction when the magnetic armature reaches its initial and/or end position.

This object is achieved by an electromagnetically operated switch valve having the features of the independent claim 1. Claims dependent thereon state advantageous embodiments and developments of the invention.

According to a preferred embodiment, the magnetic drive of the electromagnetic switch valve comprises in the conventional manner a magnetic coil and a magnetic circuit with a stationary casing and a magnetic armature movable toward the pole of the stationary casing, as well as a control for controlling the level of the energizing of the magnetic coil. It is now provided to configure the magnetic drive such that it possesses a magnetic force-stroke curve (hereinafter also "force-stroke curve") which altogether tends upwards starting out from the initial position of the magnetic armature up to the end position of the magnetic armature, that is, the magnetic force is greater in the end position of the magnetic armature than in the initial position. Furthermore, the control for energizing the magnetic coil is so set up that the energizing of the coil is increased and/or reduced during the motion of the magnetic armature between its initial position and its end position.

In contrast to the previously described prior art, the magnetic coil is thus not abruptly subjected to a firmly pre-specified, unvarying current, but rather the energizing of the coil is changed during the motion of the magnetic armature, i.e. preferably increased when the magnetic armature is moved from its initial position into its end position, and preferably reduced when the magnetic armature is moved from its end position into its initial position, for example due to spring forces. This current change is preferably effected continuously, particularly preferably linearly, but can in particular also be effected gradationally, progressively, degressively or irregularly with consideration of the course of the force-stroke curve.

In combination with the fact that the force-stroke curve of the magnetic drive altogether rises, preferably rises continuously, noise-reducing effects result due to the selected energizing course over time when the magnetic armature reaches its end position and when the magnetic armature reaches its initial position again. For the result of the proposed measure is to reduce the speed and thus the kinetic energy with which the magnetic armature and the structural group coupled with the magnetic armature hits the stop defining the end position or initial position of the magnetic armature, in comparison to a magnetic drive that is abruptly subjected to the maximum energizing while having the same force-stroke curve. This is due to the fact that the magnetic armature is first accelerated with low force due to the initially lower energizing. Comparatively little kinetic energy is therefore built up in the magnetic armature structural group over the total stroke, so that the impact noise upon reaching of the end position is accordingly low. Due to the further fact that the force-stroke curve altogether rises starting out from the initial position of the magnetic armature up to the end position of the magnetic armature, a high magnetic force can already be achieved upon reaching of the end position. The force with which the sealing element closes the flow opening of the switch valve then adds up to the sum of the magnetic force and the relatively low kinetic energy of the movable structural group appurtenant to the magnetic armature, minus any counteracting spring force.

After reaching of the end position it is advantageous to increase the energizing of the coil further and preferably hold it at the increased level over a pre-specified time period in order to guarantee a tight closing of the sealing seat even if the sealing element starts oscillating immediately after the sealing element is moved into the sealing seat. Such oscillations result in particular from the sealing seat of the switch valve being preferably of elastic configuration.

Later, the energizing of the coil can be lowered to a sub-maximum value which is high enough to ensure that the magnetic armature remains in its end position. To make the level of said energizing independent of a fluid pressure acting axially on the sealing element, the switch valve is preferably constructed as a pressure-compensated switch valve. In such valves, the pressure present axially on a front side of the sealing element is passed to the axially opposing back side.

The previously described advantages are promoted further when the force-stroke curve rises progressively before the magnetic armature reaches the end position. The progressive increase in the end phase of the armature motion has, on the one hand, the effect that the highest acceleration forces act on the magnetic armature only over a last, short time period, so that the kinetic energy of the structural group associated with the magnetic armature is relatively low upon reaching of the end position. On the other hand, the valve's closing force generated by the magnetic force is relatively high upon reaching of the end position due to the progressive rise of the force-stroke curve. A further advantage results in connection with the further increase of the energizing after reaching of the end position and thereupon holding the energizing at a reduced level. For due to the progressively rising force-stroke curve a very great magnetic force and thus closing force of the valve can already be attained by slightly increasing the energizing further. For the same reason the valve can thereupon be held in the closed position with relatively low energizing because a high magnetic force is achieved in spite of the low energizing.

It is particularly preferred when the force-stroke curve has a proportional, preferably horizontal, course, followed by the above-mentioned progressive course, from the initial position up to the end position of the magnetic armature. It is thereby attained that the acceleration of the structural group appurtenant to the magnetic armature is first low and rises at most slowly over wide portions of the motion of the magnetic armature, so that the kinetic energy of said structural group is accordingly low upon reaching of the end position. Furthermore, the progressive course of the force-stroke curve before reaching of the end position is then all the steeper, so that very high magnetic forces and thus very high closing forces of the valve are again attainable after reaching of the end position by slightly increasing the energizing further. The magnetic drive can accordingly be designed for relatively small power with an accordingly small overall size.

For the above-mentioned reasons, the proportional course of the force-stroke curve extends as far as possible, preferably over at least 50% of the stroke. In particular, it is preferred when the magnetic force is as constant as possible in the region of the proportional course of the force-stroke curve, preferably changing only by at most 20%.

A force-stroke curve with a proportional course followed by a progressive course in the direction of the end position of the magnetic armature is achievable when the pole member of the stationary casing has a cylindrical, well-like step which the magnetic armature penetrates with an axial pin, with the axial pin in turn preferably likewise being cylindrical. Within the context of the present invention, a conicity of the step of the pole member and/or of the axial pin of the magnetic armature up to a deviation of 10° from the cylindrical axis is still deemed cylindrical, with the conicity preferably lying under 10°, particularly preferably under 5°. Alternatively, the pin can be part of the pole member, and the well or step can be part of the magnetic armature, which leads to similar results. A suitable embodiment provides that the step or well of the pole member (or of the magnetic armature) possesses a depth, and the pin of the magnetic armature (or of the pole member) an axial length, of respectively about 1.5 mm, with the well possessing an inner diameter of more than 8 mm and the pin an outer diameter reduced in comparison thereto of less than 8 mm, there remaining between the pole member and the magnetic armature both axially and radially a remanence distance of less than 0.3 mm, preferably no more than 0.2 mm. The outer diameter of the magnetic armature preferably amounts to at least 9 mm in this embodiment.

The impact noise upon reaching of the end position of the magnetic armature can also be reduced upon the backward motion of the magnetic armature into its initial position, for example due to the spring force of a return spring, when the energizing of the coil is reduced during the motion of the magnetic armature from its end position into its initial position, with this reduction again preferably being effected continuously and particularly preferably linearly, and not abruptly set to zero. Since the energizing is not immediately set to zero but gradually reduced, the magnetic force first strongly decelerates the backward motion of the magnetic armature and subsequently increasingly less, so that the kinetic energy of the structural group appurtenant to the magnetic armature is accordingly low upon reaching of the initial position and the impact at the end position generates little or no noise.

In combination with a return spring it is advantageous when the energizing of the coil is so reduced that the magnetic force upon reaching of the initial position corresponds approximately to the spring force of the return spring. The kinetic energy with which the magnetic armature moves into the initial position is then relatively low. Upon reaching of the initial position the magnetic force advantageously lies at a positive value which is lower than the spring force of the return spring.

Figure 2:
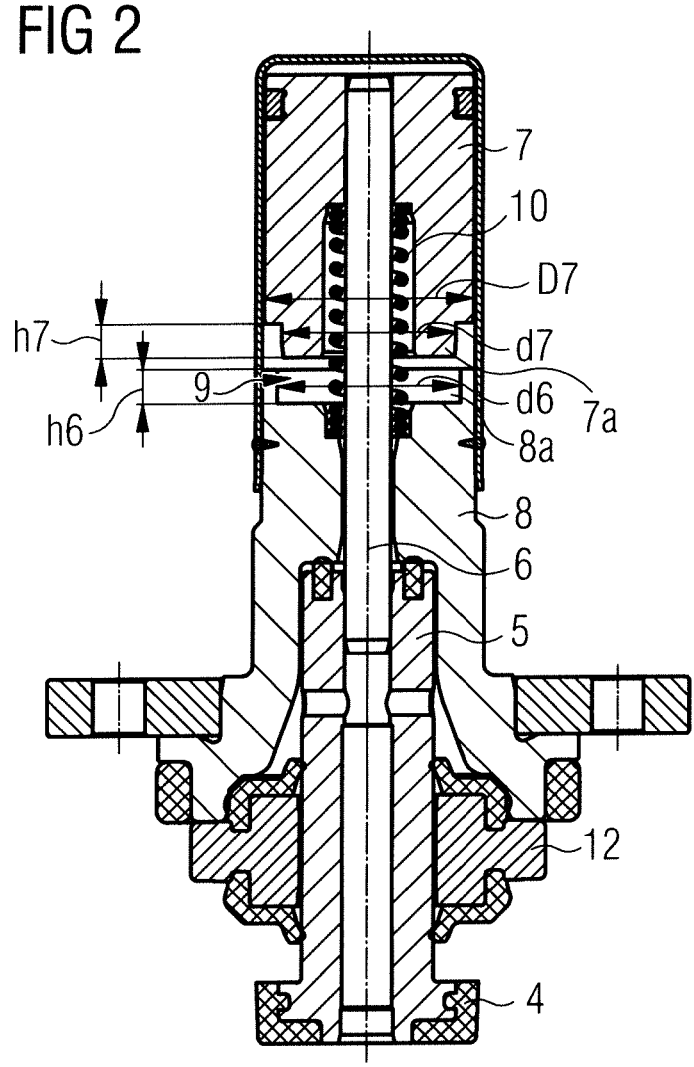
Figure 3:
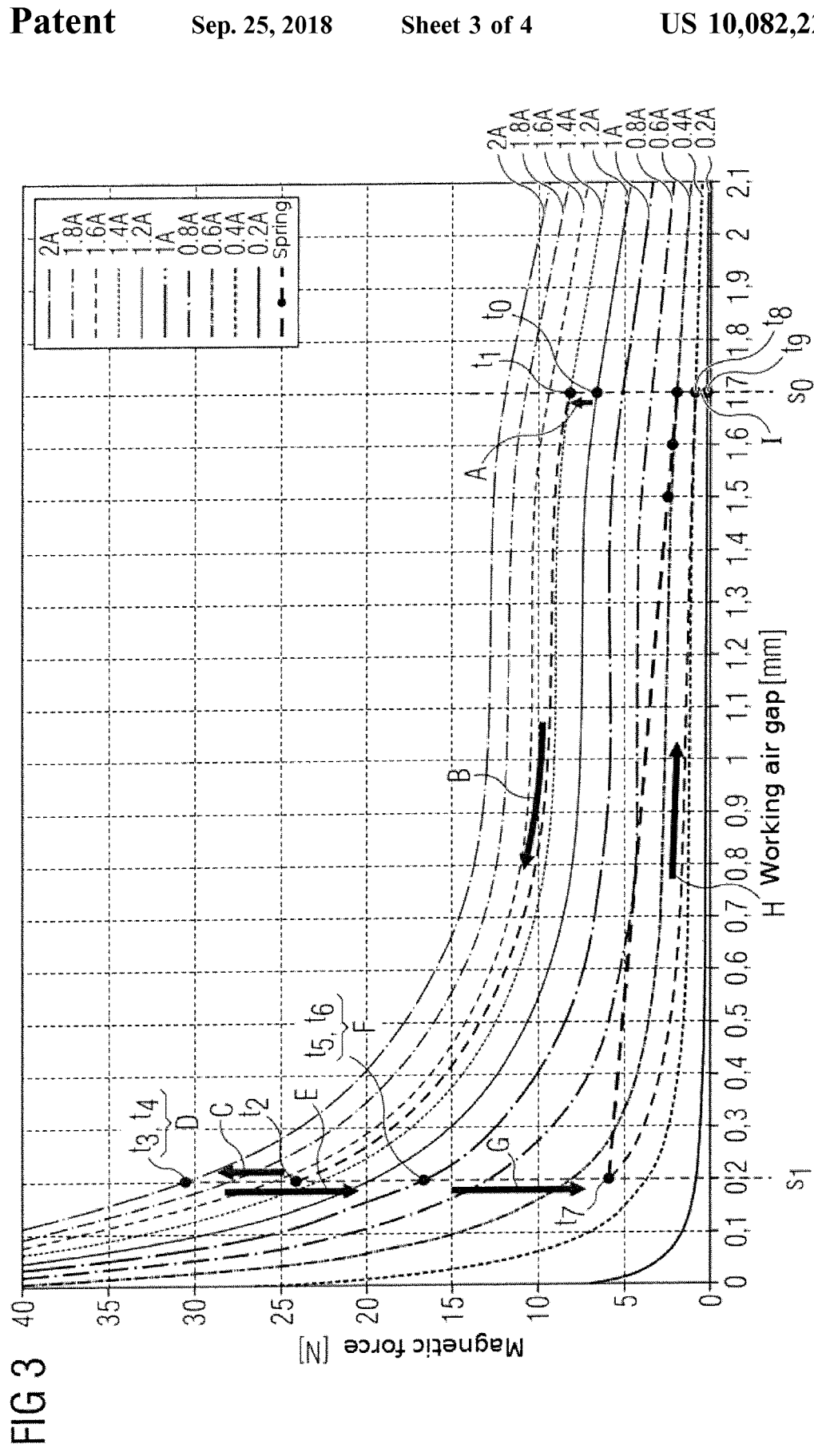
Figure 4:
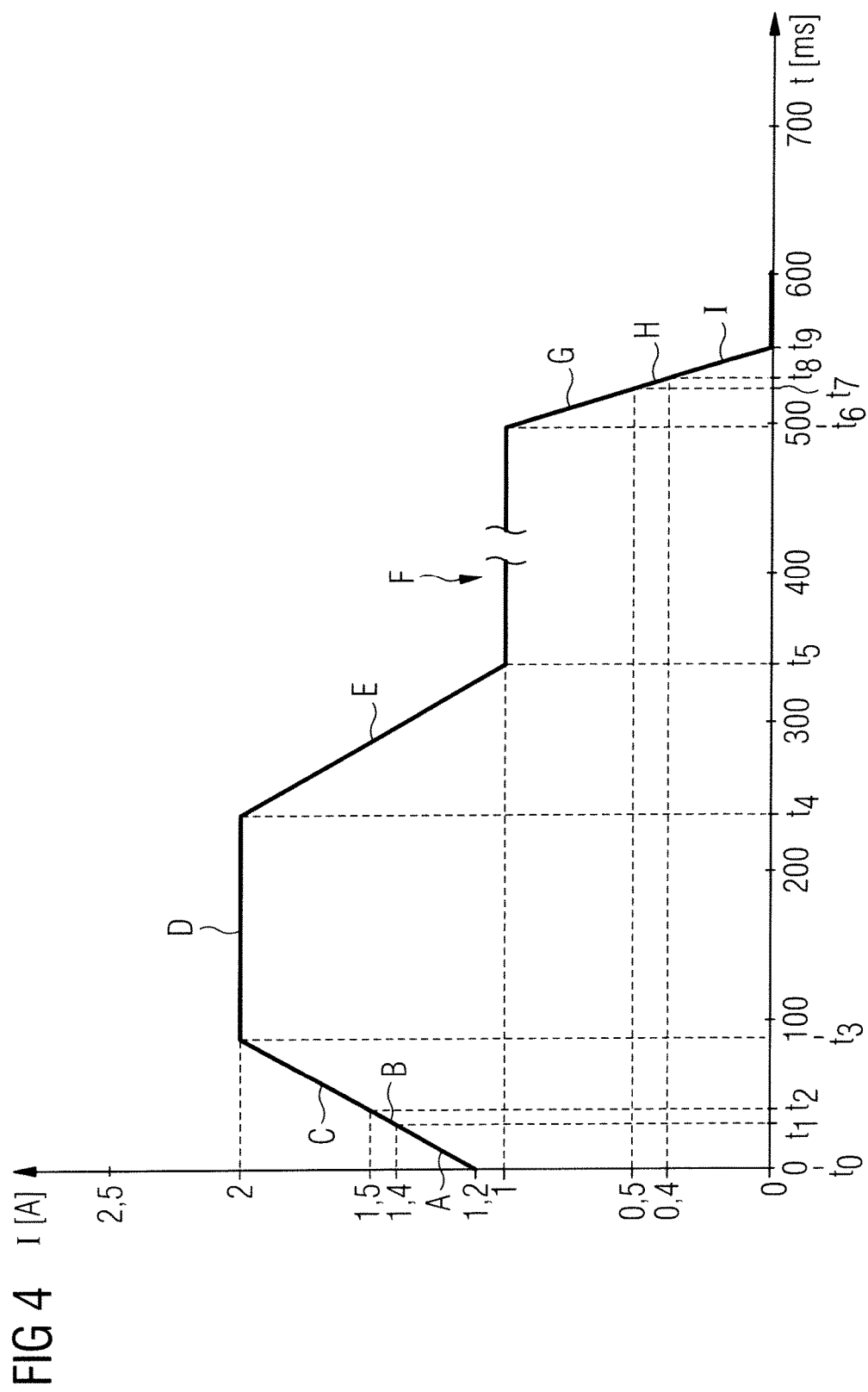

Hereinafter the invention will be explained by way of example with reference to the accompanying drawings. Therein are shown:

FIG. 1 an electromagnetically operated seat valve according to a preferred embodiment in the energized state;

FIG. 2 a detail of the switch valve according to FIG. 1 in the unenergized state;

FIG. 3 a current-time curve for the energizing of the magnetic drive of the seat valve from FIG. 1; and FIG. 4 a force-stroke curve family for the seat valve from FIG. 1.

FIG. 1 shows an electromagnetic seat valve 1 according to a preferred embodiment example. The seat valve 1 possesses a flow opening 2 with a sealing seat 3 which is closable by a sealing element 4. The sealing face of the sealing element 4 is elastically deformable to guarantee a reliable sealing of the flow opening 2, and is formed by an elastomer material. The sealing element 4 is seated at the front axial end of a plunger 5 which is coupled via a connection rod 6 with a magnetic armature 7 which is movable axially along a central axis of a magnetic coil 11. It is in principle conceivable to fasten the sealing element 4 immediately to the magnetic armature 7. It is even conceivable that the elastomer material is arranged on the side of the sealing seat 3, and the sealing element 4 is formed without any elasticity by the axially front end of the magnetic armature 7 itself. In the represented embodiment example, the plunger is firmly seated on the connection rod 6 which in turn is firmly seated in the magnetic armature 7. This results in a structural group associated with the magnetic armature 7, consisting of sealing element 4, plunger 5, connection rod 6 and magnetic armature 7.

The movable magnetic armature 7 is part of an iron circuit or magnetic circuit to which a stationary pole member 8 also belongs. Between the magnetic armature 7 and the pole member 8 there is a working air gap 9 which enables the magnetic armature 7 to move axially toward the pole member 8 when the sealing element 4 is brought into its closed position, which is represented in FIG. 1. In said closed position, the magnetic armature 7 is located in its end position in which the working air gap 9 is reduced to a residual remanence distance of about 0.2 mm.

Electrically energizing the coil 11 surrounding the magnetic armature 7 and the pole member 8 causes a magnetic circuit penetrating the magnetic armature 7 and the pole member 8 to be generated in such a way that there acts between the pole member 8 and the magnetic armature 7 via the working air gap 9 a magnetic attraction which counteracts the mechanical load of a return spring 10 and overcomes it. Said magnetic force holds the magnetic armature 7 in its end position represented in FIG. 1, and thus the seat valve 1 in its closed position. As soon as the energizing of the magnetic coil 11 is reduced to zero or at least to the extent that the resultant magnetic force is lower than the spring force of the return spring 10, the magnetic armature moves into its initial position, which is shown in the detail view in FIG. 2. The working air gap 9 then increases for example to about 1.7 mm. The "stroke" therefore amounts to 1.5 mm in this case.

The pole contour is specially configured to attain a force-stroke curve that first assumes a proportional course as horizontal as possible, followed by a course rising progressively as strongly as possible, starting out from the initial position $s_0$ of the magnetic armature 7 as shown in FIG. 2 up to the reaching of the end position $s_1$ of the magnetic armature 7 as shown in FIG. 1. For this purpose, the pole contour is configured on the pole member side with a cylindrical step as a cylindrical well or quasi-cylindrical well 8a into which the magnetic armature 7 moves with a likewise cylindrical or at least quasi-cylindrical axial pin 7a. "Cylindrical" is understood within the context of the invention to include a deviation from the cylindrical axis up to a conicity of 10° of the pole well 8a and/or of the magnetic-armature pin 7a, with the deviation preferably being below 10°, particularly preferably 5° or therebelow.

There then results a force-stroke curve as shown in the curve family according to FIG. 3, this curve being attainable with the following concrete pole and magnetic-armature dimensions: the depth $h_6$ of the cylindrical well 8a of the pole member 8 and also the axial length of the pin 7a of the magnetic armature 7 respectively amount to 1.5 mm; the cylindrical well 8a of the pole member 8 possesses an inner diameter $d_6$ of 8.05 mm and the pin 7a of the magnetic armature an outer diameter $d_7$ of 7.65 mm, so that a radial remanence distance between pole member 8 and magnetic armature 7 amounts to about 0.2 mm. The outer diameter $D_7$ of the magnetic armature 7 itself amounts to 9.23 mm, as does the outer diameter of the pole member 8 adjacent to the working air gap 9. For smaller or larger magnetic drives said dimensions can scale downward and upward approximately linearly, with the force-stroke curve being further adaptable by fine adjustment of the dimensions.

In FIG. 3 is represented the force-stroke curve of the above-described magnetic drive for different energizing levels of the magnetic coil, namely, in 0.2 ampere steps from 0.2 A to 2 A. Likewise shown is the spring characteristic of the return spring 10 over the stroke from $s_0$=1.7 mm to $s_1$=0.2 mm. It can be recognized that the magnetic drive extends partially proportionally, namely, in the stroke region from 1.7 mm to about 0.7 mm or 0.8 mm. The magnetic force then rises progressively over the remaining stroke region up to the end position $s_1$=0.2 mm.

FIG. 4 shows the current-time course for the energizing of the magnetic coil 11 over a cycle starting out from the initial position $s_0$ of the magnetic armature 7 up to its end position $s_1$ and back again into the initial position $s_0$. Said cycle will be explained hereinafter on the basis of nine phases A to I which are defined by the time points $t_0$ to $t_9$, whereby phase F from the time points $t_5$ to $t_6$ can be arbitrarily long. Said phases A to I and time points $t_0$ to $t_9$ are represented as dashed curves in the force-stroke curve family according to FIG. 3, with the arrows indicating the direction in which the dashed curve is traversed.

At the time point $t_0$ when the seat valve is to be operated, the magnetic coil 11 is first energized with a current of 1.2 A (FIG. 4). The magnetic armature is then located in its initial position with a working air gap of $s_0$=1.7 mm (FIG. 3, time point $t_0$). Then the current is increased linearly to 2 A over a time period of 90 ms. In so doing, the magnetic armature traverses the three phases A to C. In the initial phase A the spring force and the static friction of the sealing element 12 (FIG. 2) must first be overcome. Until the magnetic armature leaves its end position at the time point $t_1$, the energizing has already reached a value of about 1.4 A. Said phase A lasts somewhat more than 30 ms. Thereupon the magnetic armature moves into its end position $s_1$=0.2 mm upon further linearly rising energizing. Said phase B lasts approximately only 10 ms and is reached upon an energizing of about 1.5 to 1.7 A. The further increase of the energizing in phase C to a value of 2 A serves to avoid oscillations upon moving into the elastic sealing seat. At the time point $t_3$ the current strength of 2 A is reached after about 90 ms, said strength then being maintained during phase D lasting about 150 ms. At the time point $t_4$ when the sealing seat has been reliably closed, the energizing is brought down to a lower value, which is 1 A here. Said phase E amounts to about 60 ms, and the current of 1 A suffices as a rule to hold the valve reliably in the closed position while simultaneously overcoming the spring force of the return spring 10 and in particular pressure surges occurring at the flow opening The duration of holding phase F depends on the application specifications of the valve and can accordingly be arbitrarily long.

When the magnetic armature 7 is thereupon returned into its initial position the energizing is brought down to 0 A continuously, here linearly, with the magnetic armature first remaining in its end position until the magnetic force has decreased to the value of the counteracting spring force, which in the end position amounts to about 6 N (phase G, time points $t_5$ to $t_6$). Only thereafter does the magnetic armature move from its end position back into its initial position in phase H (time points $t_6$ to $t_7$), while in phase I (time points $t_8$ to $t_9$) the current only drops down to zero. The continuous reduction of the energizing in phase H is preferably to be selected such that the magnetic force corresponds approximately to the spring force of the return spring, so that the return spring moves the magnetic armature back but accelerates it only little due to the decelerating effect by the magnetic force. The course of phase H is slightly below the spring characteristic here, as shown in FIG. 3. It may even be expedient to increase the energizing to 0.6 A again immediately after phase G, i.e. upon reaching of 0.5 A, when the magnetic armature is just being lifted out of the end position $s_1$ due to undershooting of the spring force, and to hold it there until the magnetic armature has reached its initial position $s_0$ (cf. FIG. 3). By varying the spring stiffness of the return spring 10 the return motion of the magnetic armature 7 can be additionally influenced.

The invention claimed is:

1. An electromagnetically operated switch valve, comprising:
   a magnetic drive, comprising a magnetic coil with a central axis and a magnetic armature movable along the central axis by a stroke between an initial position and an end position, said armature forming, together with a stationary casing, a magnetic circuit and being movable from its initial position into its end position toward a pole member of the stationary casing due to electromagnetic forces upon energizing of the magnetic coil,
   a control for controlling the level of the energizing of the magnetic coil, and
   a flow opening and a sealing element for closing the flow opening, the sealing element being coupled with the magnetic armature or formed by the magnetic armature,
   wherein the magnetic drive possesses a magnetic force-stroke curve which altogether tends upwards starting out from the initial position of the magnetic armature up to the end position of the magnetic armature, and wherein the control is set up to increase or reduce or both increase and reduce the energizing of the coil during the motion of the magnetic armature between its initial position and its end position.

2. The valve according to claim 1, wherein the magnetic force-stroke curve rises progressively before reaching of the end position of the magnetic armature.

3. The valve according to claim 1, wherein the control is set up to increase the energizing of the coil continuously during the motion of the magnetic armature from its initial position into its end position.

4. The valve according to claim 1, wherein the control is set up to increase the energizing of the coil linearly during the motion of the magnetic armature from its initial position into its end position.

5. The valve according to claim 1, wherein the control is set up to increase the energizing of the coil further after reaching of the end position of the magnetic armature.

6. The valve according to claim 1, wherein the control is set up to lower the energizing of the coil to a constant value after reaching of the end position of the magnetic armature.

7. The valve according to claim 1, wherein the control is set up to reduce the energizing of the coil during the motion of the magnetic armature from its end position into its initial position.

8. The valve according to claim 1, wherein the control is set up to reduce the energizing of the coil such that when the magnetic armature reaches its initial position the magnetic force is at a positive value which is lower than the spring force of a return spring coupled with the magnetic armature.

9. The valve according to claim 1, wherein the pole member of the stationary casing has a cylindrical well which the magnetic armature penetrates with an axial and likewise cylindrical pin or the magnetic armature has the well and the pole member the pin.

10. The valve according to claim 9, wherein the well of the pole member has a depth of 1.5 mm and the pin of the magnetic armature has an axial length of 1.5 mm, the well of the pole member has an inner diameter of more than 8 mm and the pin of the magnetic armature has an outer diameter of less than 8 mm, at an outer diameter of the magnetic armature of at least 9 mm, or a corresponding multiple of all above-mentioned values.

11. The valve according to claim 1, wherein the valve is a pressure-compensated seat valve.

12. The valve according to claim 11, wherein the seat valve possesses an elastic sealing element.

13. The valve according to claim 1, wherein the magnetic force-stroke curve has a proportional course, followed by a progressive course, from the initial position of the magnetic armature up to the end position of the magnetic armature.

14. The valve according to claim 13, wherein the proportional course of the magnetic force-stroke curve extends over at least 50% of the stroke.

15. The valve according to claim 13, wherein the magnetic force changes by at most 20% in the region of the proportional course of the magnetic force-stroke curve.

* * * * *